United States Patent
Li et al.

(10) Patent No.: US 8,614,943 B2
(45) Date of Patent: Dec. 24, 2013

(54) METHOD AND APPARATUS FOR PROTECTING SUBSCRIBER ACCESS NETWORK

(75) Inventors: Changtai Li, Shenzhen (CN); Dong Yang, Shenzhen (CN); Guangyu Sun, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 100 days.

(21) Appl. No.: 13/401,431

(22) Filed: Feb. 21, 2012

(65) Prior Publication Data

US 2012/0155247 A1     Jun. 21, 2012

Related U.S. Application Data

(63) Continuation of application No. PCT/CN2009/074294, filed on Sep. 28, 2009.

(51) Int. Cl.
*G01R 31/08* (2006.01)

(52) U.S. Cl.
USPC .......................................... 370/220; 370/434

(58) Field of Classification Search
USPC ......... 370/216–221, 396, 400, 401, 431–434; 714/2, 15
See application file for complete search history.

(56) References Cited

U.S. PATENT DOCUMENTS

| 7,990,993 B1* | 8/2011 | Ghosh et al. ................... 370/428 |
| 2007/0038832 A1 | 2/2007 | Wu |
| 2008/0181241 A1 | 7/2008 | Regan et al. |
| 2009/0073998 A1* | 3/2009 | Allan et al. ................... 370/401 |

FOREIGN PATENT DOCUMENTS

| CN | 1661936 A | 8/2005 |
| CN | 101039242 A | 9/2007 |
| CN | 101179366 A | 5/2008 |
| WO | WO 2007/073761 A1 | 7/2007 |
| WO | WO 2008/054450 A1 | 5/2008 |

OTHER PUBLICATIONS

Extended European Search Report issued in corresponding European Patent Application No. 09849682.1, mailed May 31, 2012.
International Search Report and Written Opinion of the International Searching Authority issued in corresponding PCT Patent Application No. PCT/CN2009/074294, mailed Jul. 8, 2010.
Nadas, "Virtual Router Redundancy Protocol Version 3 for IPv4 and IPv6" VRRP Internet Draft, Jul. 7, 2009.

* cited by examiner

*Primary Examiner* — Kerri Rose
(74) *Attorney, Agent, or Firm* — Brinks Gilson & Lione

(57) ABSTRACT

Embodiments of the present disclosure disclose a method and an apparatus for protecting a subscriber access network, and relate to the field of communications. The method includes: connecting a Broadband Network Gateway BNG device and N predetermined Digital Subscriber Line Access Multiplexers DSLAMs to an aggregation device AGG; allocating an active BNG interface for each of the N DSLAMs, allocating a standby BNG interface set for the N DSLAMs to obtain a backup relationship, and sending the backup relationship to the AGG (102); and backing up subscriber data on the DSLAMs to the standby BNG interface set, so that when an active BNG interface fails, the AGG switches subscribers on a DSLAM served by the failed active BNG interface to a standby BNG interface in the standby BNG interface set.

18 Claims, 1 Drawing Sheet

METHOD AND APPARATUS FOR PROTECTING SUBSCRIBER ACCESS NETWORK

CROSS-REFERENCE TO RELATED APPLICATIONS

This application is a continuation of International Application No. PCT/CN2009/074294, filed on Sep. 28, 2009, which is hereby incorporated by reference in its entirety.

FIELD

The present disclosure relates to the field of communications, and in particular, to a method and an apparatus for protecting a subscriber access network.

BACKGROUND

At present, subscriber terminal devices such as computers, IPTV (Internet Protocol Television) Set Top Boxes, or VoIP (Voice over Internet Protocol) all need to access a BNG (Broadband Network Gateway) to apply for IP addresses and relevant configurations from the BNG to get the network access capabilities. The BNG may be accessed by tens of thousands of subscribers or hundreds of thousands of subscribers generally. If the BNG fails, many subscribers will be affected. Therefore, when an operator constructs a network, the protection of the subscriber access network must be considered.

In the prior art, the solution to protecting a subscriber access network is a PPPoE (Point-to-Point Protocol over Ethernet) cold backup solution. In the solution, the BNG is a BRAS (Broadband Remote Access Server); PPPoE packets of subscribers on a DSLAM (Digital Subscriber Line Access Multiplexer) are sent to an active BRAS and a standby BRAS simultaneously, or are sent to different interfaces of the same BRAS simultaneously, where one interface is an active BRAS interface and the other interface is a standby BRAS interface.

After analyzing the prior art, the inventor finds the following problem:

In the prior art, because the backup relationship in the PPPoE cold backup protection solution is fixed, when the active and standby BRAS interfaces both fail, a subscriber is unable to access the network, which affects the subscriber service greatly.

SUMMARY

Embodiments of the present disclosure provide a method and an apparatus for protecting a subscriber access network so that a subscriber can still access the network after the active and standby BNG interfaces both fail and that the impact on the subscriber service can be reduced. The solution is as follows:

An embodiment of the present disclosure provides a method for protecting a subscriber access network, where the method includes: connecting a Broadband Network Gateway (BNG) device and N predetermined Digital Subscriber Line Access Multiplexers (DSLAMs) to an aggregation device (AGG); allocating an active BNG interface for each of the N DSLAMs, allocating a standby BNG interface set for the N DSLAMs to obtain a backup relationship, and sending the backup relationship to the AGG; and backing up subscriber data on the DSLAMs to the standby BNG interface set, so that when an active BNG interface fails, the AGG switches subscribers on a DSLAM served by the failed active BNG interface to a standby BNG interface in the standby BNG interface set, where N is a natural number.

An embodiment of the present disclosure provides an apparatus for protecting a subscriber access network, where the apparatus includes: a connecting module, configured to connect a Broadband Network Gateway (BNG) device and N predetermined Digital Subscriber Line Access Multiplexers (DSLAMs) to an aggregation device (AGG); an allocating module, configured to: allocate an active BNG interface for each of the N DSLAMs, allocate a standby BNG interface set for the N DSLAMs to obtain a backup relationship, and send the backup relationship to the AGG; and a first backup module, configured to back up subscriber data on the DSLAMs to the standby BNG interface set, so that when an active BNG interface fails, the AGG switches subscribers on a DSLAM served by the failed active BNG interface to a standby BNG interface in the standby BNG interface set, where N is a natural number.

The solution provided in embodiments of the present disclosure brings the following advantages: An active BNG interface is allocated for each of N DSLAMs, and a standby BNG interface set is allocated for the N DSLAMs; when any active BNG interface fails, a subscriber may be migrated to a standby BNG interface; when the standby BNG interface fails again, a resource management system may allocate another standby BNG interface, and the subscriber can still access the network, thus reducing the impact on the subscriber service.

DETAILED DESCRIPTION OF THE EMBODIMENTS

To make the solution, objectives, and merits of the present disclosure clearer, the following describes the embodiments of the present disclosure in detail with reference to accompanying drawings.

Embodiment 1

Figure 1:
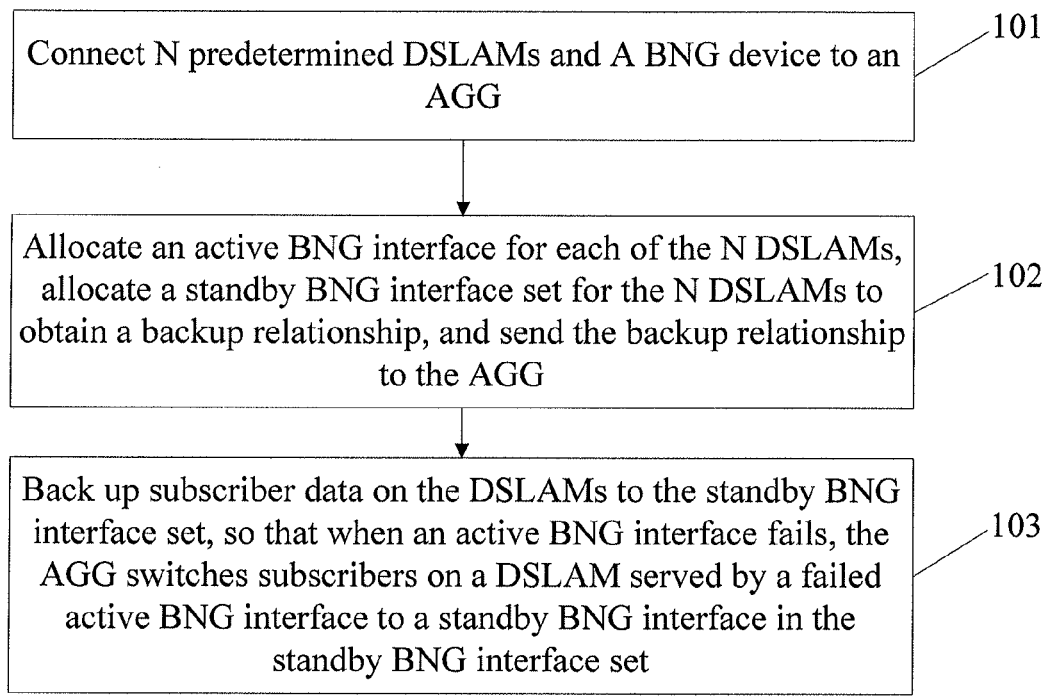
FIG. 1 is a schematic flowchart of a method for protecting a subscriber access network provided in Embodiment 1 of the present disclosure.

As shown in FIG. 1, an embodiment of the present disclosure provides a method for protecting a subscriber access network. The method includes:

101. Connect N predetermined DSLAMs and a BNG device to an AGG (aggregation device).

The N DSLAMs may be connected to the AGG directly or through a Metropolitan Area Network, where the BNG device may be one or multiple BNG devices.

102. Allocate an active BNG interface for each of the N DSLAMs, allocate a standby BNG interface set for the N DSLAMs to obtain a backup relationship, and send the backup relationship to the AGG.

For example, an active BNG interface is allocated for each DSLAM, and a standby BNG interface set is allocated for the N DSLAMs; the relationship between the active BNG interface and the standby BNG interface corresponding to each DSLAM is called a backup relationship.

103. Back up subscriber data on the DSLAMs to the standby BNG interface set, so that when an active BNG interface fails, the AGG switches subscribers on a DSLAM served by the failed active BNG interface to a standby BNG interface in the standby BNG interface set, thus ensuring that services can proceed normally, where N is a natural number.

Before allocating an active BNG interface for each of the N DSLAMs, the method further includes:

A resource management system obtains the topology information and resource state information of the BNG device, and the topology information and resource state information of the AGG.

Accordingly, the process of allocating an active BNG interface for each of the N DSLAMs includes:

Allocate an active BNG interface for each of the N DSLAMs according to the obtained topology information and resource state information.

In this embodiment, when the resource management system obtains the topology information and resource state information, each BNG device needs to report the topology information of the connection between the BNG device and the AGG and the resource state information to the resource management system. The topology information and resource state information reported by the BNG device include: an ID of each interface of the BNG device connected to the AGG, link state of the interface, and access capability, where the access capability includes information such as the quantity of subscribers that may access the network, interface bandwidth, and range of the VLAN (Virtual Local Area Network) that can be accessed.

The AGG also needs to report the topology information of the connections between the AGG and the DSLAM and between the AGG and the BNG device and the resource state information to the resource management system. The topology information and resource state information reported by the AGG include information such as an ID of the interface of the AGG connected to each DSLAM, an ID of the interface of the AGG connected to each BNG device, and state of each interface.

If multiple services exist on a DSLAM and need to be accessible to different BNG devices, in the information reported by the AGG, the ID of the DSLAM needs to be changed to DSLAM ID+service ID; if three services exist on a DSLAM and need to be accessible to different BNG devices, in the information reported by the AGG, the ID of the DSLAM is changed to DSLAM ID+ID of service 1, DSLAM ID+ID of service 2, and DSLAM ID+ID of service 3, where the IDs of the three services correspond to three different BNG devices. For ease of description, in this embodiment, all services on one DSLAM are accessible to the same BNG device.

It should be noted that an active BNG interface serving the DSLAM and a standby BNG interface set may be allocated for each DSLAM according to the preset manual configuration library information in addition to the collected topology information and resource state information. For example, initially, a BNG interface serving the DSLAM is configured for each DSLAM manually; or a BNG interface may be allocated automatically according to the subscriber's allocation policy.

In this embodiment, when the backup relationship is sent to the AGG, the backup relationship may also be sent to the relevant active BNG interfaces, enabling the active BNG interfaces to perform relevant configurations according to requirement, for example, configure the accessed VLAN and the access mode.

The process of allocating a standby BNG interface set for the N DSLAMs includes:

Allocate multiple standby BNG interfaces for each of the N DSLAMs, where the multiple standby BNG interfaces serve as a standby BNG interface set.

Accordingly, the process of backing up subscriber data on the DSLAMs to the standby BNG interface set includes:

Back up all subscriber data on each of the N DSLAMs to the multiple standby BNG interfaces in the standby BNG interface set.

Accordingly, the process of enabling the AGG to switch subscribers on a DSLAM served by the failed active BNG interface to a standby BNG interface in the standby BNG interface set when any active BNG interface fails includes:

Enable the AGG to switch subscribers on a DSLAM served by the failed active BNG interface to any one standby BNG interface in the standby BNG interface set when any active BNG interface fails. Because the subscriber data of each of the N DSLAMs is backed up on any one standby BNG interface, services can be recovered quickly.

Alternatively, the process of allocating a standby BNG interface set for the N DSLAMs includes:

Allocate a standby BNG interface for each of the N DSLAMs, where all the standby BNG interfaces allocated for the N DSLAMs serve as a standby BNG interface set.

Accordingly, the process of backing up subscriber data on the DSLAMs to the standby BNG interface set includes:

Back up the subscriber data on the DSLAM served by the active BNG interface to the allocated corresponding standby BNG interface.

Accordingly, the process of enabling the AGG to switch subscribers on a DSLAM served by the failed active BNG interface to a standby BNG interface in the standby BNG interface set when any active BNG interface fails includes:

Enable the AGG to switch subscribers on a DSLAM served by the failed active BNG interface to the allocated corresponding standby BNG interface when the active BNG interface fails. In this case, the corresponding standby BNG interface serves as a new active BNG interface, and subscriber data is backed up on the new active BNG interface. Therefore, services can be recovered quickly. Then, reallocate a new standby BNG interface for the new active BNG interface.

In this embodiment, when the active BNG interface is normal, the active BNG interface provides access service for the subscribers on the corresponding DSLAM.

When the active BNG interface fails, the AGG may autonomously switch the subscribers on the DSLAM served by the active BNG interface to the standby BNG interface.

Alternatively, when the active BNG interface fails, the AGG first sends a failure message of the active BNG interface to the resource management system rather than performs a switch autonomously.

After receiving the failure message, the resource management system sends a switching command to the AGG; then according to the switching command, the AGG switches the subscribers on the DSLAM served by the active BNG interface to the standby BNG interface.

It should be noted that in the prior art, the backup relationship is predetermined and fixed, that is, a standby BNG interface is specified for an active BNG interface for the backup purpose. In the static backup relationship, when both the active BNG interface and the standby BNG interface fail, though other available standby BNG interfaces exist, subscriber services cannot be protected and the configurations can only be adjusted manually. The backup relationship obtained in the embodiment of the present disclosure is calculated according to the obtained topology information and resource state information, and the backup relationship is dynamic, unlike the fixed backup relationship in the prior art.

Because the backup relationship is flexible, it can provide more complete protection for the subscriber access network. For example, if the original active BNG interface fails, after the standby BNG interface switches to a new active BNG interface, and the new active BNG interface fails again, the prior art cannot provide protection; in the embodiment of the present disclosure, a standby BNG interface is specified again for the new active BNG interface according to the topology information and resource state information if there is an available standby BNG interface, without any manual protection configuration.

Further, the method may also include:

When the active BNG interface recovers to normal, the recovered active BNG interface and the AGG report a message indicating the resource is normal to the resource management system. The resource management system may use the active BNG interface as a standby BNG interface, or switch the subscribers on the DSLAM originally served by the active BNG interface back again, or withdraw the active BNG interface as an active and/or standby BNG interface for future rescheduling.

It should be noted that a BNG interface may serve as an active BNG interface for a DSLAM and a standby BNG interface for other DSLAMs at the same time.

For example, there are five BNG interfaces A, B, C, D, and E; initially, A, B, and C are active BNG interfaces, and D and E are standby BNG interfaces. When A fails, D changes from a standby BNG interface to an active BNG interface, and E is still a standby BNG interface. When A recovers to normal, the resource management system may use A as a standby BNG interface; or switch the original DSLAM on A back again to use A as an active BNG interface again; or withdraw A directly and use it again for future rescheduling.

In some scenarios of actual applications, some DSLAMs on the first BNG device in the BNG devices need to be migrated to the second BNG device. Therefore, the method may further include:

According to the obtained topology information and resource state information of the BNG devices and AGG, when determining to migrate some DSLAMs on the first BNG device in the BNG devices to the second BNG device in the BNG devices, notify the first BNG device and second BNG device of the DSLAMs to be migrated, and enable the second BNG device to back up subscriber data on the DSLAMs.

After receiving a backup complete message, the AGG is notified so that the AGG migrates some DSLAMs on the first BNG device to the second BNG device.

Alternatively, migration may be performed inside a BNG device, that is, some DSLAMs on the first BNG interface or board of the BNG device need to be migrated to the second BNG interface or the board of the BNG device. Therefore, the method may further include:

According to the obtained topology information and resource state information of the BNG device and AGG, when determining to migrate some DSLAMs on the first BNG interface or board of the BNG device to the second BNG interface or board of the BNG device, notify the first BNG interface or board of the DSLAMs to be migrated, notify the second BNG interface or board of the DSLAMs to be migrated, and enable the second BNG interface or board to back up subscriber data on the DSLAMs.

After receiving a backup complete message, the AGG is notified so that the AGG migrates some DSLAMs on the first BNG interface or board to the second BNG interface or board.

In the solution to migrate some DSLAMs to be migrated from the first BNG device or interface or board to the second BNG device or interface or board according to the embodiment of the present disclosure, the second BNG device or interface or board is not necessarily preconfigured, and the destination of migration is determined real time according to the topology information and resource state information instead. On a BNG device, the BNG device or interface or board where fewest resources are occupied may be used as the destination of migration. If the destination of migration is preconfigured, the migration may fail and thus subscriber service is interrupted because the preconfigured state is inconsistent with the real-time state.

It should be noted that after the migration is completed, the resource management system may also recalculate the backup relationship.

For example, the traffic tide scenario in an actual application may require that some DSLAMs on the first BNG device in the BNG devices should be migrated to the second BNG device in the BNG devices; the traffic tide means that in a period of time, the subscriber quantity and traffic on some BNG devices may exceed the resource capability limit of the BNG devices, while resources on other BNG devices may be in the relatively idle state.

In the traffic tide scenario, the embodiment of the present disclosure may implement reallocation of BNG resources without interrupting subscriber services, as detailed below.

In the traffic tide scenario, the method may further include:

The resource management system sets an alarm threshold for the quantity of subscribers or traffic on each BNG device in the BNG devices;

The subscriber quantity or traffic, which is reported by each BNG device, on each DSLAM accessed by the each BNG device is received;

When the subscriber quantity or traffic on the first BNG device in the BNG devices is greater than the alarm threshold, while the subscriber quantity or traffic on the second BNG device in the BNG devices is less than the alarm threshold, the resource management system is triggered, and the resource management system notifies the AGG, so that the AGG migrates subscribers or traffic on the first BNG device exceeding the alarm threshold to the second BNG device on which the subscriber quantity or traffic is less than the alarm threshold.

Preferably, when the actual traffic on the first BNG device reaching the alarm threshold lasts a period of time, an alarm message may be sent to the resource management system; after receiving the alarm message, the resource management system notifies the AGG, so that the AGG performs migration. In this way, the case of burst traffic may be avoided. If the excess part is migrated to another BNG device after the burst traffic exceeds the threshold at a moment, and migration is performed again after the burst traffic decreases at a next moment, the system performance deteriorates because of frequent switches.

Alternatively, when migration is performed inside a BNG device, that is, some DSLAMs on the first BNG interface or board of a BNG device need to be migrated to the second BNG interface or board of the BNG device, the method includes:

Set an alarm threshold for the subscriber quantity or traffic on each BNG interface or board of the BNG device.

Receive the subscriber quantity or traffic, which is reported by a BNG device on predetermined time, on each DSLAM accessed by the BNG device.

When the subscriber quantity or traffic on the first BNG interface or board of the BNG device is greater than the alarm threshold, while the subscriber quantity or traffic on the second BNG interface or board of the BNG device is less than the alarm threshold, the AGG is notified so that the AGG migrates the subscribers or traffic on the first BNG interface or board exceeding the alarm threshold to the second BNG interface or board on which the subscriber quantity or traffic is less than the alarm threshold.

In this embodiment, the resource management system may plan the network according to the actual subscriber quantity or traffic on each BNG device in the BNG devices, and make the subscribers or traffic on each BNG device balanced; or the resource management system may centralize the subscribers distributed on each BNG device to a specified number of BNG devices according to subscriber requirement.

Alternatively, network planning may be performed inside a BNG device, that is, make the subscribers or traffic on each BNG interface or board balanced according to the actual subscriber quantity or traffic on each BNG interface or board of the BNG device; or centralize the subscribers distributed on each BNG interface or board to a specified number of BNG interfaces or boards according to subscriber requirement.

This embodiment brings the following advantages: an active BNG interface is allocated for each of N DSLAMs, and a standby BNG interface set is allocated for the N DSLAMs; the backup relationship obtained is dynamic and flexible and can provide more complete protection for the subscriber access network. For example, when the active BNG interface fails, the subscriber may be migrated to the standby BNG interface, so that the subscriber may access the network again in time and that the impact on the subscriber service is reduced. In addition, when the active and standby BNG interfaces both fail, the resource management system may still use other available standby BNG interface to perform protection if there is an available standby BNG interface, thus further reducing the impact on the subscriber service.

Embodiment 2

Figure 2:
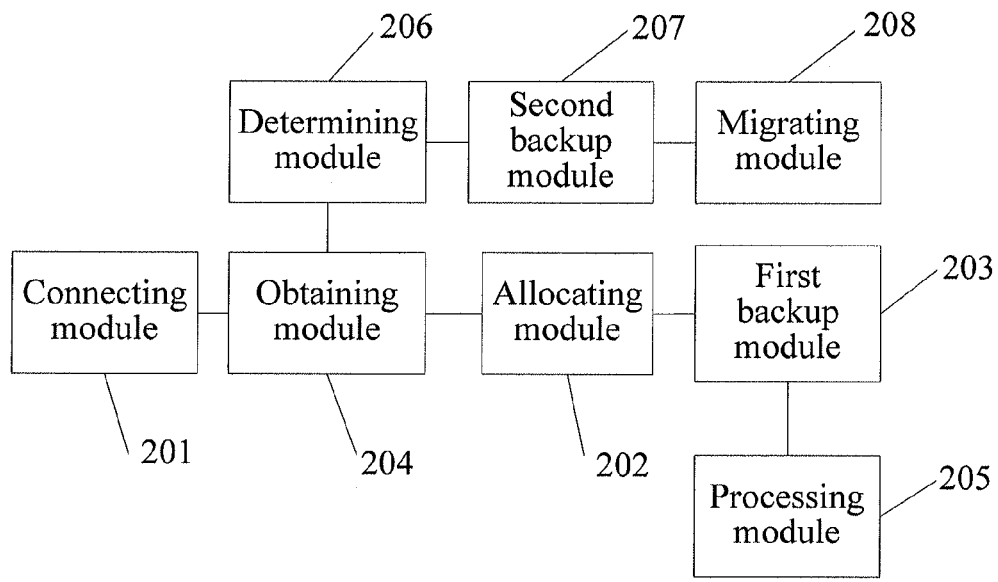
FIG. 2 is a schematic structure diagram of an apparatus for protecting a subscriber access network provided in Embodiment 2 of the present disclosure.

As shown in FIG. 2, this embodiment provides an apparatus for protecting a subscriber access network. The apparatus includes: a connecting module 201, an allocating module 202, and a first backup module 203.

The connecting module 201 is configured to connect a BNG device and N predetermined DSLAMs to an AGG.

The BNG device may be one or multiple BNG devices.

The allocating module 202 is configured to: allocate an active BNG interface for each of the N DSLAMs, allocate a standby BNG interface set for the N DSLAMs to obtain a backup relationship, and send the backup relationship to the AGG.

The first backup module 203 is configured to back up subscriber data on the DSLAMs to the standby BNG interface set, so that when an active BNG interface fails, the AGG switches subscribers on a DSLAM served by the failed active BNG interface to a standby BNG interface in the standby BNG interface set, where N is a natural number.

The apparatus further includes: an obtaining module 204, configured to obtain topology information and resource state information of the BNG device, and topology information and resource state information of the AGG.

Accordingly, the allocating module 202 is configured to: allocate an active BNG interface for each of the N DSLAMs according to the topology information and resource state information obtained by the obtaining module, allocate a standby BNG interface set for the N DSLAMs to obtain a backup relationship, and send the backup relationship to the AGG.

In this embodiment, the topology information and resource state information obtained by the obtaining module 204 include the topology information of the connection between the BNG device and the AGG and the resource state information that are reported by each BNG device. The topology information and resource state information reported by the BNG device include: an ID of each interface of the BNG device connected to the AGG, link state of the interface, and access capability, which includes information such as the quantity of subscribers that may access the network, interface bandwidth, and range of the VLAN that can be accessed.

The topology information and resource state information obtained by the obtaining module 204 further include the topology information of the connections between the AGG and the DSLAM and the connections between the AGG and the BNG device and the resource state information that are reported by the AGG. The topology information and resource state information reported by the AGG include: an ID of the interface of the AGG connected to each DSLAM, an ID of the interface of the AGG connected to each BNG device, and state of each interface.

If multiple services exist on a DSLAM and need to be accessible to different BNG devices, in the information reported by the AGG, the ID of the DSLAM needs to be changed to DSLAM ID+service ID; if three services exist on a DSLAM and need to be accessible to different BNG devices, in the information reported by the AGG, the ID of the DSLAM is changed to DSLAM ID+ID of service 1, DSLAM ID+ID of service 2, and DSLAM ID+ID of service 3, where the IDs of the three services correspond to three different BNG devices. For ease of description, in this embodiment, all services on one DSLAM are accessible to the same BNG device.

The allocating module 202 includes a first allocating unit, a second allocating unit, and a sending unit.

The first allocating unit is configured to allocate an active BNG interface for each of the N DSLAMs.

The second allocating unit is configured to allocate a standby BNG interface set for the N DSLAMSs.

The sending unit is configured to obtain a backup relationship according to the first allocating unit and the second allocating unit, and send the backup relationship to the AGG.

For example, an active BNG interface is allocated for each DSLAM, and a standby BNG interface set is allocated for the N DSLAMs; the relationship between the active BNG interface and the standby BNG interface corresponding to each DSLAM is called a backup relationship.

The second allocating unit is configured to allocate multiple standby BNG interfaces for each of the N DSLAMs, where the multiple standby BNG interfaces serve as a standby BNG interface set.

Accordingly, the first backup module 203 is configured to: back up all subscriber data on each of the N DSLAMs to multiple standby BNG interfaces in the standby BNG interface set, so that when any active BNG interface fails, the AGG switches subscribers on a DSLAM served by the failed active BNG interface to a standby BNG interface in the standby NBG interface set.

Alternatively, the second allocating unit is configured to allocate a standby BNG interface for each of the N DSLAMs, where all the standby BNG interfaces allocated for the N DSLAMs serve as a standby BNG interface set.

Accordingly, the first backup module 203 is configured to back up the subscriber data on the DSLAM served by the active BNG interface to the allocated corresponding standby BNG interface, so that when the active BNG interface fails, the AGG switches subscribers on a DSLAM served by the failed active BNG interface to the allocated corresponding standby BNG interface. In this case, the corresponding standby BNG interface serves as a new active BNG interface, and then a new standby BNG interface is allocated for the new active BNG interface.

It should be noted that the allocating module 202 may allocate an active BNG interface and a standby BNG interface for each DSLAM according to the preset manual configuration library information in addition to the collected topology information and resource state information. For example, initially, a BNG interface serving the DSLAM is configured for each DSLAM manually; or a BNG interface may be allocated automatically according to the allocation policy of a subscriber.

It should be noted that in the prior art, the backup relationship is predetermined and fixed, that is, a standby BNG interface is specified for an active BNG interface for the backup purpose. In this static backup relationship, when both the active BNG interface and the standby BNG interface fail, though other available standby BNG interfaces exist, subscriber services cannot be protected and the configurations can only be adjusted manually. The backup relationship obtained in the embodiment of the present disclosure is calculated according to the obtained topology information and resource state information, and the backup relationship is dynamic, unlike the fixed backup relationship in the prior art. Because the backup relationship is flexible, it can provide more complete protection for the subscriber access network. For example, if the original active BNG interface fails, after the standby BNG interface switches as a new active BNG interface, the new active BNG interface fails again, the prior art cannot provide protection; in the embodiment of the present disclosure, a standby BNG interface is specified again for the new active BNG interface according to the topology information and resource state information if an available standby BNG interface exists, without any manual protection configuration.

Further, the apparatus may also include a processing module 205, which is configured to: use an active BNG interface as a standby BNG interface when the active BNG interface is recovered to normal, or switch the subscribers on the DSLAM originally served by the active BNG interface back again; or withdraw the active BNG interface as an active and/or standby BNG interface for future rescheduling.

In some actual application scenarios, some DSLAMs on the first BNG device in the BNG devices need to be migrated to the second BNG device. Therefore, the apparatus may further include a determining module 206, a second backup module 207, and a migrating module 208.

The determining module 206 is configured to determine to migrate some DSLAMs on the first BNG device in the BNG devices to the second BNG device in the BNG devices according to the topology information and resource state information of the BNG device and AGG obtained by the obtaining module 204.

The second backup module 207 is configured to: when the determining module 206 determines to migrate some DSLAMs on the first BNG device to the second BNG device, notify the first BNG device and the second BNG device of the DSLAMs to be migrated, and enable the second BNG device to back up subscriber data on the DSLAMs to be migrated.

The migrating module 208 is configured to migrate the DSLAMs to be migrated on the first BNG device to the second BNG device after the second backup module 207 enables the second BNG device to complete backing up subscriber data on the DSLAMs to be migrated.

Alternatively, in some cases, migration may be performed inside a BNG device, that is, some DSLAMs on the first BNG interface or board of the BNG device need to be migrated to the second BNG interface or board. Therefore, the determining module 206 in the apparatus is configured to determine to migrate some DSLAMs on the first BNG interface or board of the BNG device to the second BNG interface or board of the BNG device according to the topology information and resource state information of the BNG device and AGG obtained by the obtaining module 204.

The second backup module 207 is configured to notify the first BNG interface or board and the second BNG interface or board of the DSLAMs to be migrated when the determining module 206 determines to migrate some DSLAMs on the first BNG interface or board of the BNG device to the second BNG interface or board of the BNG device, and enable the second BNG interface or board to back up the subscriber data on the DSLAMs to be migrated.

The migrating module 208 is configured to migrate some DSLAMs on the first BNG interface or board to the second BNG interface or board after the second backup module 207 enables the second BNG interface or board to complete backing up subscriber data on the DSLAMs to be migrated.

For example, in the traffic tide scenario of an actual application, some DSLAMs on a BNG device may need to be migrated to another BNG device; in this case, the determining module 206 includes:

- a setting unit, configured to set an alarm threshold for the subscriber quantity or traffic on each BNG device in the BNG devices;
- a receiving unit, configured to receive the subscriber quantity or traffic, which is reported by a BNG device on predetermined time, on each DSLAM accessed by the BNG device; and
- a determining unit, configured to determine to migrate some DSLAMs on the first BNG device to the second BNG device when the subscriber quantity or traffic on the first BNG device in the BNG devices is greater than the alarm threshold set by the setting unit while the subscriber quantity or traffic on the second BNG device in the BNG devices is less than the alarm threshold set by the setting unit.

Alternatively, when migration is performed inside a BNG device, the setting unit is configured to set an alarm threshold for the subscriber quantity or traffic on each BNG interface or board of the BNG device;

- the receiving unit is configured to receive the subscriber quantity or traffic, which is reported by a BNG device on predetermined time, on each DSLAM accessed by the BNG device; and
- the determining unit is configured to: when the subscriber quantity or traffic on the first BNG interface or board of the BNG device is greater than the alarm threshold, while the subscriber quantity or traffic on the second BNG interface or board of the BNG device is less than the alarm threshold, the AGG is notified so that the AGG migrates the subscribers or traffic on the first BNG interface or board exceeding the alarm threshold to the second BNG interface or board on which the subscriber quantity or traffic is less than the alarm threshold.

In this embodiment, the apparatus may further include a planning module, which is configured to: plan the network according to the actual subscriber quantity or traffic on each BNG device in the BNG devices, and make the subscribers or traffic on each BNG device balanced; or centralize the subscribers distributed on each BNG device to a specified number of BNG devices according to subscriber requirement.

Alternatively, when planning is performed inside a BNG device, the planning module is configured to: plan the network according to the actual subscriber quantity or traffic on each BNG interface or board of the BNG device, and make the subscribers or traffic on each BNG interface or board balanced; or centralize the subscribers distributed on each BNG interface or board to a specified number of BNG interfaces or boards according to subscriber requirement.

This embodiment brings the following advantages: topology information and resource state information of the BNG device and AGG are collected; an active BNG interface serving a DSLAM and a standby BNG interface are allocated for each DSLAM according to the topology information and resource state information; the backup relationship obtained is dynamic and flexible and can provide more complete protection for the subscriber access network. For example, when the active BNG interface fails, a subscriber may be migrated to the standby BNG interface, so that the subscriber may access the network again in time and that the impact on the subscriber service is reduced. In addition, it is unnecessary to back up an idle BNG interface, which reduces the protection cost. Because the backup relationship is dynamic, when the active and standby BNG interfaces both fail, the resource management system may still use other available standby BNG interfaces to perform protection if there is an available standby BNG interfaces, thus further reducing the impact on the subscriber service.

The embodiments of the present disclosure may be implemented by a software program, which may be stored in a readable storage medium accessible to a processor, such as a hard disk, a memory, or a Compact Disk-Read Only Memory (CD-ROM).

Detailed above are only exemplary embodiments of the present disclosure and the present disclosure is not limited thereto. Any modifications and variations made without departing from the spirit and principle of the disclosure shall fall within the scope of the present disclosure.

The invention claimed is:

1. A method for protecting a subscriber access network, comprising:
    connecting a Broadband Network Gateway (BNG) device and N predetermined Digital Subscriber Line Access Multiplexers (DSLAMs) to an aggregation device (AGG);
    allocating an active BNG interface for each of the N DSLAMs, allocating a standby BNG interface set for the N DSLAMs to obtain a backup relationship, and sending the backup relationship to the AGG; and
    backing up subscriber data on the DSLAMs to the standby BNG interface set, so that when an active BNG interface fails, the AGG switches subscribers on a DSLAM served by the failed active BNG interface to a standby BNG interface in the standby BNG interface set, wherein N is a natural number;
    wherein allocating the standby BNG interface set for the N DSLAMs comprises:
    allocating a standby BNG interface for each of the N DSLAMs, wherein all the standby BNG interfaces allocated for the N DSLAMs serve as the standby BNG interface set;
    wherein backing up subscriber data on the DSLAMs to the standby BNG interface set comprises:
    backing up subscriber data on the DSLAM served by the active BNG interface to the allocated corresponding standby BNG interface; and
    wherein when the active BNG interface fails, the AGG switches subscribers on the DSLAM served by the failed active BNG interface to the standby BNG interface in the standby BNG interface set comprises:
the AGG switches the subscribers on the DSLAM served by the failed active BNG interface to the allocated corresponding standby BNG interface when the active BNG interface fails, wherein the corresponding standby BNG interface serves as a new active BNG interface, and reallocating a new standby BNG interface for the new active BNG interface.

2. The method according to claim 1, wherein, before allocating the active BNG interface for each of the N DSLAMs, the method further comprises:
    obtaining topology information and resource state information of the BNG device, and topology information and resource state information of the AGG; and
    allocating an active BNG interface for each of the N DSLAMs according to the topology information and resource state information of the BNG device and the AGG.

3. The method according to claim 2, further comprising:
    according to the topology information and resource state information of the BNG device and the AGG, when determining to migrate some DSLAMs on a first BNG interface or board of the BNG device to a second BNG interface or board of the BNG device, notifying the first BNG interface or board of the DSLAMs to be migrated, notifying the second BNG interface or board of the DSLAMs to be migrated, and enabling the second BNG interface or board to back up subscriber data on the DSLAMs to be migrated; and
    after receiving a backup complete message, notifying the AGG, so that the AGG migrates the DSLAMs on the first BNG interface or board to the second BNG interface or board.

4. The method according to claim 3, wherein determining to migrate some DSLAMs on a first BNG interface or board of the BNG device to a second BNG interface or board of the BNG device comprises:
    setting an alarm threshold for the subscriber quantity or traffic on each BNG interface or board of the BNG device;
    receiving the subscriber quantity or traffic, which is reported by a BNG device on predetermined time, on each DSLAM accessed by the BNG device; and
    when the subscriber quantity or traffic on the first BNG interface or board of the BNG device is greater than the alarm threshold, while the subscriber quantity or traffic on the second BNG interface or board of the BNG device is less than the alarm threshold, notifying the AGG, so that the AGG migrates subscribers or traffic on the first BNG interface or board exceeding the alarm threshold to the second BNG interface or board on which the subscriber quantity or traffic is less than the alarm threshold.

5. The method according to claim 2, further comprising:
    according to the topology information and resource state information of the BNG device and the AGG, when determining to migrate some DSLAMs on a first BNG device in the BNG devices to a second BNG device in the BNG devices, notifying the first BNG device and the second BNG device of the DSLAMs to be migrated, and enabling the second BNG device to back up subscriber data on the DSLAMs to be migrated; and
    after receiving a backup complete message, notifying the AGG, so that the AGG migrates the DSLAMs to be migrated on the first BNG device to the second BNG device.

6. The method according to claim 5, wherein determining to migrate some DSLAMs on a first BNG interface of the BNG device to a second BNG device of the BNG device comprises:

setting an alarm threshold for the subscriber quantity or traffic on each BNG device in the BNG devices;

receiving the subscriber quantity or traffic, which is reported by a BNG device on predetermined time, on each DSLAM accessed by the BNG device; and when the subscriber quantity or traffic on the first BNG device in the BNG devices is greater than the alarm threshold, while the subscriber quantity or traffic on the second BNG device in the BNG devices is less than the alarm threshold, notifying the AGG, so that the AGG migrates subscribers or traffic on the first BNG device exceeding the alarm threshold to the second BNG device on which the subscriber quantity or traffic is less than the alarm threshold.

7. The method according to claim 1, wherein, allocating a standby BNG interface set for the N DSLAMs comprises:

allocating multiple standby BNG interfaces for each of the N DSLAMs, wherein the multiple standby BNG interfaces serve as a standby BNG interface set;

wherein backing up subscriber data on the DSLAMs to the standby BNG interface set comprises:

backing up all subscriber data on each of the N DSLAMs to multiple standby BNG interfaces in the standby BNG interface set; and wherein when an active BNG interface fails, the AGG switches subscribers on a DSLAM served by the failed active BNG interface to a standby BNG interface in the standby BNG interface set comprises:

when an active BNG interface fails, the AGG switches the subscribers on the DSLAM served by the failed active BNG interface to any standby BNG interface in the standby BNG interface set.

8. The method according to claim 1, further comprising at least one of the following:

when the active BNG interface recovers to normal, using the active BNG interface as the standby BNG interface; switching the subscribers on the DSLAM originally served by the active BNG interface back again; and withdrawing the active BNG interface as an active and/or standby BNG interface for future rescheduling.

9. The method according to claim 1, further comprising at least one of the following:

performing network planning according to actual subscriber quantity or traffic on each BNG device in the BNG devices to make subscribers or traffic on each BNG device balanced; or centralizing the subscribers distributed on each BNG device to a specified number of BNG devices according to subscriber requirement; and performing network planning according to actual subscriber quantity or traffic on each BNG interface or board of the BNG device to make subscribers or traffic on each BNG interface or board balanced; or centralizing the subscribers distributed on each BNG interface or board to a specified number of BNG interfaces or boards according to subscriber requirement.

10. An apparatus for protecting a subscriber access network, comprising:

a connecting module, configured to connect a Broadband Network Gateway (BNG) device and N predetermined Digital Subscriber Line Access Multiplexers (DSLAMs) to an aggregation device (AGG);

an allocating module, configured to: allocate an active BNG interface for each of the N DSLAMs, allocate a standby BNG interface set for the N DSLAMs to obtain a backup relationship, and send the backup relationship to the AGG; and a first backup module, configured to back up subscriber data on the DSLAMs to the standby BNG interface set, so that when an active BNG interface fails, the AGG switches subscribers on a DSLAM served by the failed active BNG interface to a standby BNG interface in the standby BNG interface set, wherein N is a natural number;

wherein the allocating module comprises a first allocating unit, a second allocating unit, and a sending unit;

the first allocating unit is configured to allocate the active BNG interface for each of the N DSLAMs;

the second allocating unit is configured to allocate the standby BNG interface set for the N DSLAMSs; and the sending unit is configured to obtain the backup relationship according to the first allocating unit and the second allocating unit, and send the backup relationship to the AGG, wherein the second allocating unit is configured to allocate the standby BNG interface for each of the N DSLAMs, wherein all the standby BNG interfaces allocated for the N DSLAMs serve as a standby BNG interface set; and the first backup module is configured to back up subscriber data on the DSLAM served by the active BNG interface to the allocated corresponding standby BNG interface, so that when the active BNG interface fails, the AGG switches subscribers on the DSLAM served by the failed active BNG interface to the allocated corresponding standby BNG interface, wherein the corresponding standby BNG interface serves as a new active BNG interface, and a new standby BNG interface is reallocated for the new active BNG interface.

11. The apparatus according to claim 10, further comprising:

an obtaining module, configured to obtain topology information and resource state information of the BNG device, and topology information and resource state information of the AGG; and the allocating module, configured to: allocate the active BNG interface for each of the N DSLAMs according to the topology information and resource state information of the BNG device and the AGG obtained by the obtaining module, allocate a standby BNG interface set for the N DSLAMs to obtain a backup relationship, and send the backup relationship to the AGG.

12. The apparatus according to claim 11, further comprising:

a determining module, configured to determine to migrate some DSLAMs on a first BNG interface or board of the BNG device to a second BNG interface or board of the BNG device according to the topology information and resource state information of the BNG device and the AGG obtained by the obtaining module;

a second backup module, configured to: when the determining module determines to migrate some DSLAMs on the first BNG interface or board of the BNG device to the second BNG interface or board of the BNG device, notify the first BNG interface or board and the second BNG interface or board of the DSLAMs to be migrated, and enable the second BNG interface or board to back up subscriber data on the DSLAMs; and a migrating module, configured to migrate the DSLAMs on the first BNG interface or board to the second BNG interface or board.

13. The apparatus according to claim 12, wherein the determining module comprises:
- a setting unit, configured to set an alarm threshold for subscriber quantity or traffic on each BNG interface or board of the BNG device;
- a receiving unit, configured to receive the subscriber quantity or traffic, which is reported by a BNG device on predetermined time, on each DSLAM accessed by the BNG device; and
- a determining unit, configured to: when the subscriber quantity or traffic on the first BNG interface or board of the BNG device is greater than the alarm threshold, while the subscriber quantity or traffic on the second BNG interface or board of the BNG device is less than the alarm threshold, the AGG is notified so that the AGG migrates subscribers or traffic on the first BNG interface or board exceeding the alarm threshold to the second BNG interface or board on which the subscriber quantity or traffic is less than the alarm threshold.

14. The apparatus according to claim 11, further comprising:
- a determining module, configured to determine to migrate some DSLAMs on a first BNG device in the BNG devices to a second BNG device in the BNG devices according to the topology information and resource state information of the BNG device and the AGG obtained by the obtaining module;
- a second backup module, configured to: when the determining module determines to migrate some DSLAMs on the first BNG device in the BNG devices to the second BNG device in the BNG devices, notify the first BNG device and the second BNG device of the DSLAMs to be migrated, and enable the second BNG device to back up subscriber data on the DSLAMs; and
- a migrating module, configured to migrate the DSLAMs on the first BNG device to the second BNG device.

15. The apparatus according to claim 14, wherein the determining module comprises:
- a setting unit, configured to set an alarm threshold for subscriber quantity or traffic on each BNG device in the BNG devices;
- a receiving unit, configured to receive the subscriber quantity or traffic, which is reported by a BNG device on predetermined time, on each DSLAM accessed by the BNG device; and
- a determining unit, configured to: when the subscriber quantity or traffic on the first BNG device in the BNG devices received by the receiving unit is greater than the alarm threshold, while the subscriber quantity or traffic on the second BNG device in the BNG devices is less than the alarm threshold, the AGG is notified so that the AGG migrates subscribers or traffic on the first BNG device exceeding the alarm threshold to the second BNG device on which the subscriber quantity or traffic is less than the alarm threshold.

16. The apparatus according to claim 10, wherein
the second allocating unit is configured to allocate multiple standby BNG interfaces for each of the N DSLAMs, wherein the multiple standby BNG interfaces serve as a standby BNG interface set; and
the first backup module is configured to: back up all subscriber data on each of the N DSLAMs to the multiple standby BNG interfaces in the standby BNG interface set, so that when the active BNG interface fails, the AGG switches the subscribers on the DSLAM served by the failed active BNG interface to a standby BNG interface in the standby NBG interface set.

17. The apparatus according to claim 10, further comprising:
- a processing module, configured to: when the active BNG interface recovers to normal, use the active BNG interface as a standby BNG interface; or switch the subscribers on the DSLAM originally served by the active BNG interface back again; or withdraw the active BNG interface as an active and/or standby BNG interface for future rescheduling.

18. The apparatus according to claim 10, further comprising:
- a planning module, configured to: perform network planning according to actual subscriber quantity or traffic on each BNG device in the BNG devices to make subscribers or traffic on each BNG device balanced; or centralize the subscribers distributed on each BNG device to a specified number of BNG devices according to subscriber requirement; or
- the planning module, configured to: perform network planning according to actual subscriber quantity or traffic on each BNG interface or board of the BNG device to make subscribers or traffic on each BNG interface or board balanced; or centralize the subscribers distributed on each BNG interface or board to a specified number of BNG interfaces or boards according to subscriber requirement.

* * * * *